Oct. 7, 1924.
C. F. HART
1,511,123
WEASEL TRAP
Filed June 2, 1922
2 Sheets-Sheet 1
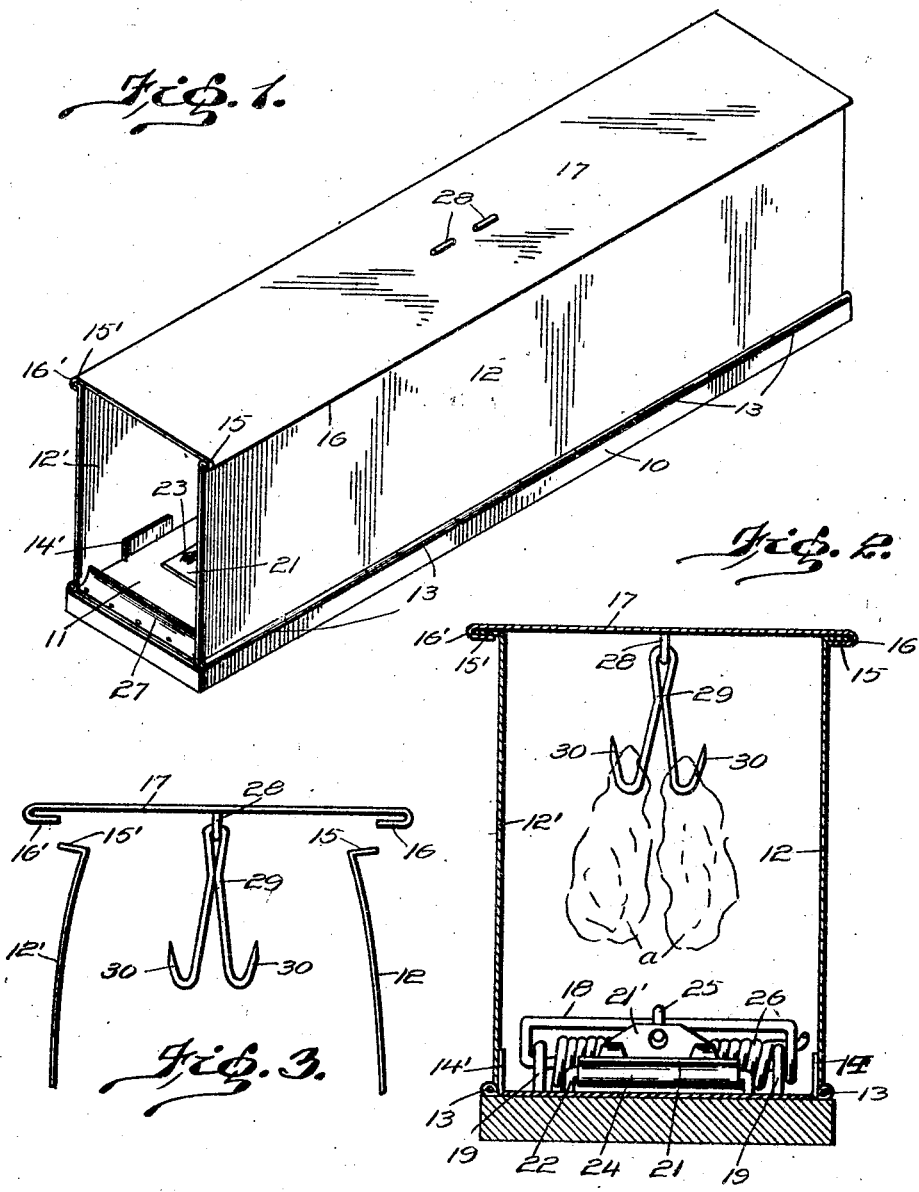
INVENTOR.
Charles F. Hart,
BY
Geo. F. Kimmel
ATTORNEY.

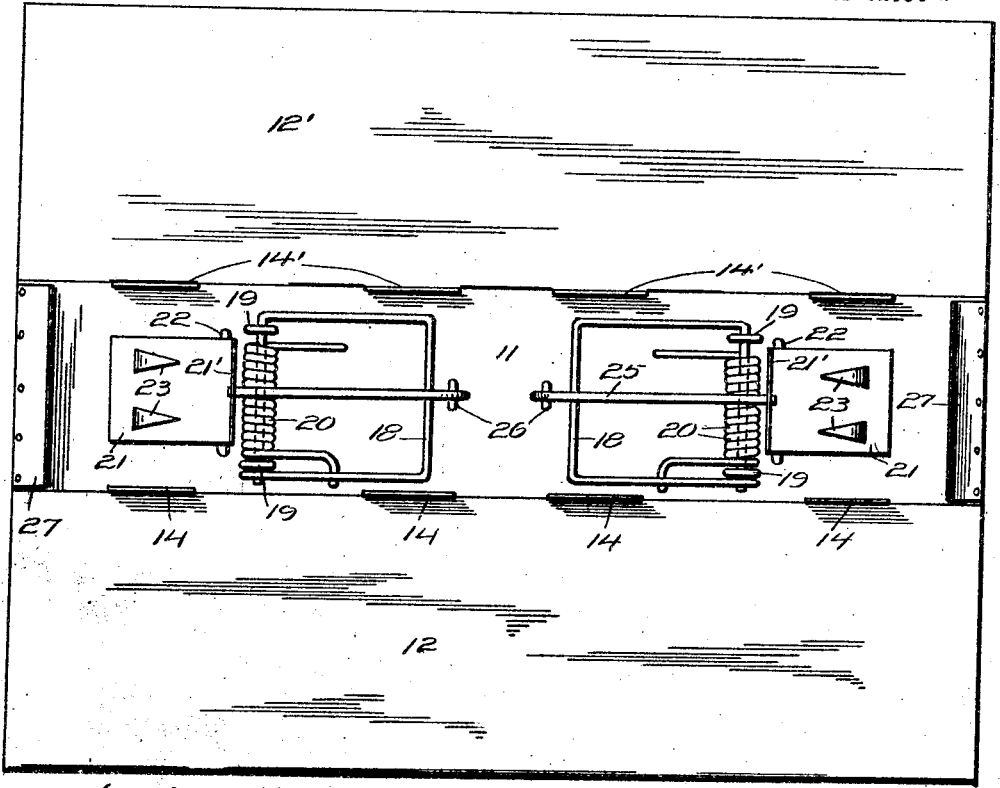
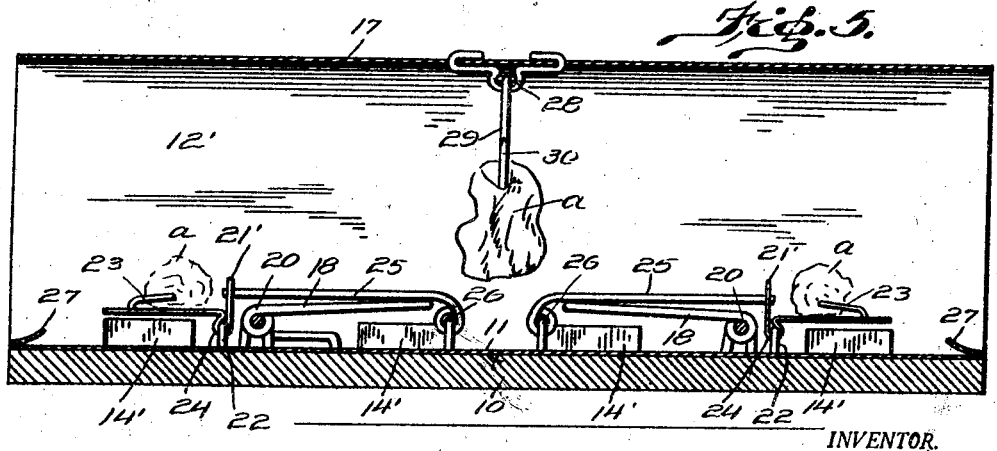

Patented Oct. 7, 1924.

1,511,123

UNITED STATES PATENT OFFICE.

CHARLES F. HART, OF BOTTINEAU, NORTH DAKOTA.

WEASEL TRAP.

Application filed June 2, 1922. Serial No. 565,290.

*To all whom it may concern:*

Be it known that I, CHARLES F. HART, a citizen of the United States, residing at Bottineau, in the county of Bottineau and State of North Dakota, have invented certain new and useful Improvements in Weasel Traps, of which the following is a specification.

This invention appertains to certain improvements in animal traps generally and more particularly to a double form of such traps designed for the catching or entrapping of weasels or other animals of a similar species.

The primary object of the invention is to provide for a trap of the class described, and one of a simplified construction and arrangement embodying a novel form or encasement or tunnel-like form for housing the traps per se, and which encasement is capable of being readily and easily opened to give full and free access to the traps for the inspection, baiting and setting thereof, or for the release and removal therefrom of an animal or animals caught or entrapped therein.

With the foregoing and other equally important objects in view, the invention resides in the certain new and useful construction and arrangement of parts as will be hereinafter more fully described, set forth in the appended claims, and illustrated in the accompanying drawings, in which:—

Figure 1 is a perspective view of a preferred embodiment of the trap and as the same appears when set up and ready for use, Figure 2 is a vertical transverse section through the same, Figure 3 is a fragmentary detail, in end elevation, of the side and top walls of the encasement as they appear separated one from the other and arranged in position ready for the interlocking or assembling of the same, Figure 4 is a plan view of the trap with the top wall of the encasement removed, and the side walls thereof swung downwardly at the opposite sides of the base, whereby the traps per se are exposed to view for the setting or release of the same, and Figure 5 is a vertical longitudinal section through the encasement with the traps and the bait holding means in side elevation.

Referring to the drawings, wherein similar characters of reference designate corresponding parts through the several views thereof, the numeral 10 indicates a substantially elongated base of rectangular formation, preferably of wood or the like, having secured on the upper face a sheet metal plate 11 of equal area therewith. A pair of oppositely disposed longitudinal side walls 12 and 12' are provided and the same are hinged at their lower edges as at 13 and 13', respectively, to the oppositely disposed longitudinal side edges of the metal bottom plate 11, while spaced between the hinged portions formed with the latter for cooperation with the hinged portions of side walls 12 and 12', are upstanding ears 14 and 14' against which the side walls 12 and 12' abut, when swung on the hinge 13 and 13' to vertical position. The upper longitudinal edges of the side walls 12 and 12' are outturned at right angles to provide flanges 15 and 15' which are engaged in inwardly opening channel-ways 16 and 16' formed by the underturning of the longitudinal side edges of an upper or top wall 17. This upper or top wall 17 is of a slightly greater width than that of the base 10 and the plate 11 mounted thereon, so that, to have the flanges 15 and 15' engage in the channel-ways 16 and 16' thereof, the vertical side walls 12 and 12' must be inwardly flexed beyond the vertical planes of the opposite side edges of the base 10, and then allowed to spring outwardly, when the channel-ways 16 and 16' are alined therewith for the purpose.

This construction provides for a novel encasement of tunnel-like formation open at both ends, for the housing therein of a pair of oppositely disposed traps of substantially conventional form. The traps are carried by the metal plate 11, being secured on the upper face thereof in any suitable manner, and each arranged to face one of the open ends of the encasement. Each of these traps comprises a wire jaw 18 mounted to swinging pivot eye or staples 19. The jaw 18 may be formed from a length of wire bent into proper shape and surrounding the inner transverse portions of the jaws 18 are coil springs 20, tending to spring the jaws in their forward direction of movement or toward the opposite open ends of the encasement. Pivoted on the plate 11 so as to project forwardly and medially of the pivot points of the jaws 18, are triggers 21 which are swingingly supported on staples or the like 22, secured in the plate 11. These triggers 21 are preferably formed of pieces of suitable resilient sheet metal and are each provided with pairs of suitably directed and upwardly struck prongs 23 for the reception thereon of pieces of bait *a*. The inner ends of the triggers 21 are formed to provide bent portions 24 of looped formation to freely receive the staples 22, and then rise vertically to provide portions 21 having openings formed therein to receive the free outer ends of a pair of jaw setting arms 25, which are pivoted at their inner ends to staples or the like 26 secured in the plate 11 at points on the longitudinal center of the latter and inwardly of the free ends of the jaw 18 when the same are disposed in their set positions. When the jaws 18 are set, the same are swung to inwardly directed positions, substantially as shown in Figures 1 and 2, when the arms 25 will be swung in a forward direction over the free ends of the jaws 18, and the free ends of the same engaged in the openings formed in the vertical portions 21′ of the triggers 21. Secured at the opposite end edges of the plate 11 and curving upwardly and inwardly therefrom, are stationary jaw elements 27 with which the free end of the pivoted jaws 18 are cooperative for gripping and otherwise trapping an animal, such as a weasel or like. Secured in the removable top wall 17, of the encasement, is a staple wire or clip 28 formed to provide an inwardly directed eye supporting thereon a bait receiving member 29, which member is preferably formed of a suitable length of wire bent to provide hooked end portions 30 having their free ends sharpened for the ready engagement thereon of pieces of bait *a*. This hook member 29 is preferably suspended in position from the staple or clip 28 in position medially between the inner ends of the traps whereby as thus constructed and arranged pieces of bait *a* will be secured on the prongs 23, of the triggers 21, and on the pointed ends of the hook portion 30, and the traps will then be set substantially as shown in Figures 1 and 2. Now when the animal, such as a weasel or the like, enters one of the ends of the encasement and brings its weight to bear against one of the triggers 21, in its attempt to reach and partake of the bait thereon, the bait trigger 21 will be depressed in a manner to cause it to release the complemental jaw setting arm 25, so that the spring 20 will be free to act on the jaw 18 to swing the same in an upwardly and forwardly direction and then downwardly whereby to entrap the animal between itself and the stationary jaw piece 27 disposed at the end edge of the bottom wall of the encasement. In the event of the bait *a*, on one or both of the triggers 21 being consumed or removed by the animal or animals without effecting the release of the jaw 18, the trap is still baited by reason of the pieces of bait *a* being held on the hooks 30, so that the chance for an animal to reach all of the bait *a* without causing a springing of one of the traps is rendered practically impossible.

From the foregoing, it will be readily apparent that, while a preferred embodiment of the trap has been described and illustrated herein in specific terms and details of construction, arrangement, and operation, various changes in and modifications of the same may be resorted to without departing from the spirit of the invention, or the scope of the claims appended hereunto.

Having thus fully described the invention, what is claimed is:—

1. A trap comprising a base, a pair of resilient side walls hinged at their lower ends therewith, each of said walls at its upper end formed with an outwardly extending right angularly disposed flange, a top having inturned longitudinal marginal portions coacting with said flanges, said portions and flanges detachably connecting the side walls with said top, said base, side walls and top providing a trapping compartment open at each end, and abutments carried by the base and engaged by the inner sides of said walls.

2. A trap for the purpose set forth comprising an elongated hollow body portion forming a trapping compartment open at each end, a pair of oppositely disposed and inwardly extending upwardly inclined stationary jaws secured upon the bottom of the compartment at opposite ends thereof, said stationary jaws of a length substantially equal to the width of and extending transversely of said compartment, a pair of oppositely disposed spring actuated trapping jaws arranged within said compartment between the center thereof and the stationary jaws, an individual bait holding means normally connected with a spring actuated jaw and interposed therebetween and a stationary jaw, and a second bait holding means independently supported from within said compartment between said spring actuated jaws.

In testimony whereof, I affix my signature hereto.

CHARLES F. HART.